United States Patent
Nozaki

(10) Patent No.: US 10,895,037 B2
(45) Date of Patent: Jan. 19, 2021

(54) STEEL CORD FOR REINFORCING RUBBER ARTICLE

(71) Applicant: BRIDGESTONE CORPORATION, Tokyo (JP)

(72) Inventor: Yusuke Nozaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 113 days.

(21) Appl. No.: 16/378,668

(22) Filed: Apr. 9, 2019

(65) Prior Publication Data
US 2019/0234016 A1  Aug. 1, 2019

Related U.S. Application Data

(63) Continuation-in-part of application No. 15/328,731, filed as application No. PCT/JP2015/071407 on Jul. 28, 2015, now abandoned.

(30) Foreign Application Priority Data

Jul. 28, 2014  (JP) .................................. 2014-153033

(51) Int. Cl.
*D07B 1/06* (2006.01)
*B60C 9/00* (2006.01)
*B60C 9/20* (2006.01)

(52) U.S. Cl.
CPC .......... *D07B 1/0613* (2013.01); *B60C 9/0007* (2013.01); *B60C 9/2006* (2013.01);
(Continued)

(58) Field of Classification Search
CPC ...... D07B 1/06; D07B 1/0613; D07B 1/0626; D07B 1/0633; D07B 1/0606; D07B 1/062;
(Continued)

(56) References Cited

U.S. PATENT DOCUMENTS 5,956,935 A * 9/1999 Katayama ............. B60C 9/0007
                                                              152/527
6,272,830 B1   8/2001 Morgan et al.
(Continued)

FOREIGN PATENT DOCUMENTS

JP   2008-150757 A   7/2008
JP   2009-299223 A  12/2009
(Continued)

OTHER PUBLICATIONS

"Tire Cord", Kirk-Othmer Encyclopedia of Chemical Technology, Dec. 2000, XP055472079, 23 pages total.
(Continued)

*Primary Examiner* — Ismael Izaguirre
(74) *Attorney, Agent, or Firm* — Sughrue Mion, PLLC

(57) ABSTRACT

Provided is a steel cord for reinforcing a rubber article which can further improve cut resistance when applied to a tire. Provided is a steel cord for reinforcing a rubber article including: one core strand 11 having a layered-twisted structure formed by twisting a plurality of steel filaments 1; and a plurality of sheath strands 12 having a layered-twisted structure formed by twisting a plurality of steel filaments 2, wherein the sheath strands are twisted around the core strand. A ratio S1/S of the sum S1 of cross-sectional areas of outermost layer sheath filaments constituting an outermost layer sheath of the core strand to the sum S of cross-sectional areas of all filaments constituting the core strand is from 0.69 to 0.74, and a ratio Ps/P of the sum Ps of strengths of the sheath strands to strength P of the cord as a whole is from 0.81 to 0.85.

7 Claims, 1 Drawing Sheet

(52) U.S. Cl.
CPC ......... *D07B 1/0626* (2013.01); *D07B 1/0633* (2013.01); *B60C 2200/065* (2013.01); *D07B 2201/202* (2013.01); *D07B 2201/2006* (2013.01); *D07B 2201/2051* (2013.01); *D07B 2201/2061* (2013.01); *D07B 2501/2046* (2013.01)

(58) Field of Classification Search
CPC .... D07B 1/0673; D07B 1/068; D07B 1/0686; D07B 1/0693; D07B 1/10; D07B 2201/2006; D07B 2201/202; D07B 2201/2051; D07B 2201/2061; D07B 2201/1014; D07B 2201/2009; D07B 2201/2046; D07B 2501/2046; B60C 9/00; B60C 9/0007; B60C 9/2006; B60C 2200/06; B60C 2200/065; B60C 2200/02–14
See application file for complete search history.

(56) References Cited

U.S. PATENT DOCUMENTS

| 6,863,103 | B1 | 3/2005 | Masubuchi et al. |
| 2010/0170215 | A1* | 7/2010 | Nishimura ........... D07B 1/0613 57/258 |
| 2010/0300592 | A1* | 12/2010 | Miyazaki ............. B60C 9/0007 152/451 |
| 2011/0088825 | A1 | 4/2011 | Kudo |
| 2011/0209808 | A1 | 9/2011 | Nakamura |
| 2012/0043003 | A1 | 2/2012 | Masubuchi et al. |
| 2013/0032264 | A1 | 2/2013 | Cheng et al. |

FOREIGN PATENT DOCUMENTS

| JP | 2010-116655 A | 5/2010 |
| JP | 2011-42910 A | 3/2011 |
| JP | 2016-56456 A | 4/2016 |
| WO | 01/34900 A1 | 5/2001 |
| WO | 2010/082666 A1 | 7/2010 |
| WO | 2010/126084 A1 | 11/2010 |
| WO | 2015/090920 A1 | 6/2015 |

OTHER PUBLICATIONS

Communication dated Jul. 17, 2017 from the European Patent Office in counterpart Application No. 15828190.7.
Communication dated May 15, 2018, issued by the European Patent Office in corresponding European Application No. 15 828 190.7.
International Search Report of PCT/JP2015/071407, dated Oct. 20, 2015. [PCT/ISA/210].

* cited by examiner

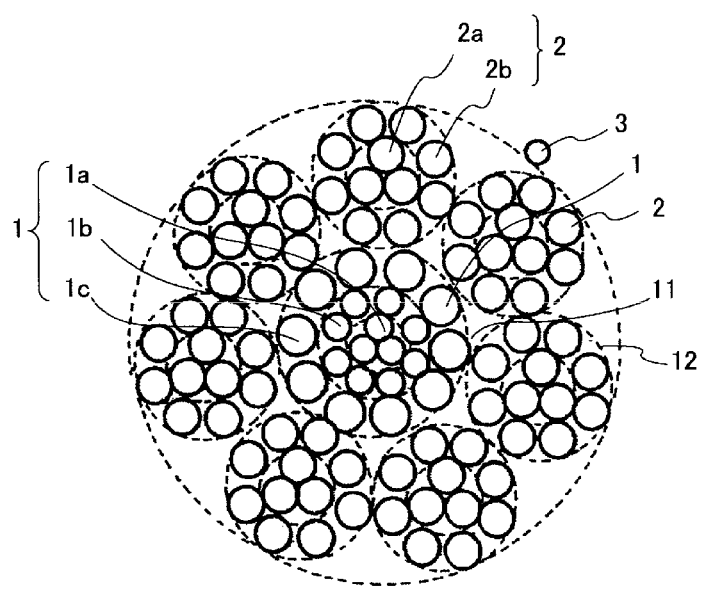

STEEL CORD FOR REINFORCING RUBBER ARTICLE

CROSS-REFERENCE TO RELATED APPLICATIONS

This is a Continuation-In-Part Application of U.S. patent application Ser. No. 15/328,731, filed Jan. 24, 2017, which is a National Stage Application of PCT/JP2015/071407 filed Jul. 28, 2015, and claims priority benefit based on Japanese Patent Application 2014-153033 filed Jul. 28, 2014. The entire disclosures of the prior applications are considered part of the disclosure of the accompanying continuation application, and are hereby incorporated by reference.

TECHNICAL FIELD

The present invention relates dto a steel cord for reinforcing a rubber article (hereinafter, also simply referred to as "cord"), and particularly to a steel cord for reinforcing a rubber article for use in reinforcing applications for rubber articles such as tires.

BACKGROUND ART

For a rubber article such as a tire, a steel cord formed by twisting a plurality of steel filaments is widely used as a reinforcing material. In particular, since a tire used for a heavy duty vehicle such as a construction vehicle is used under heavy loading on rough terrain having sharp rises or drops or the like, a steel cord to be used as a reinforcing material is demanded to have a particularly high strength and resistance. For this reason, in such a large tire, a steel cord having a so-called multi-twisted structure, which is formed by twisting a plurality of strands formed by twisting a plurality of steel filaments, is employed.

As a prior art relating to a steel cord having a multi-twisted structure, for example, Patent Document 1 discloses a technique in which, in a steel cord for reinforcing a rubber article having a multi-twisted structure formed by twisting a plurality of strands having a layered-twisted structure in which a plurality of steel filaments are twisted, the ratio dc/ds of the diameter dc of an outermost layer sheath filament constituting an outermost layer sheath of a core strand to the diameter ds of an outermost layer sheath filament constituting an outermost layer sheath of a sheath strand is set to from 1.05 to 1.25 to prevent the occurrence of a preceding break of an outermost layer filament, thereby improving the cord strength.

RELATED ART DOCUMENT

Patent Document

Patent Document 1: Japanese Unexamined Patent Application Publication No. 2009-299223 (Claims and the like)

SUMMARY OF THE INVENTION

Problems to be Solved by the Invention

For tires used in construction vehicles or the like, resistance to blunt or acute protrusions such as rocks, that is, cut resistance is also important. In order to increase the cut resistance in a cord having a multi-twisted structure, improvement of the resistance of a core strand to tightening of a sheath strand is considered, and a technique described in Patent Document 1 is also known.

However, under the demand for further improvement in the tire performance in recent years, realization of a tire whose cut resistance is further improved is also demanded.

Accordingly, an object of the present invention is to provide a steel cord for reinforcing a rubber article which can further improve cut resistance when applied to a tire.

Means for Solving the Problems

The present inventor intensively studied to find that the above-described problems can be solved by employing the following configuration, thereby completing the present invention.

That is, the steel cord for reinforcing a rubber article of the present invention is a steel cord for reinforcing a rubber article comprising: one core strand having a layered-twisted structure formed by twisting a plurality of steel filaments; and a plurality of sheath strands having a layered-twisted structure formed by twisting a plurality of steel filaments, wherein the sheath strands are twisted around the core strand, and wherein a ratio S1/S of the sum S1 of cross-sectional areas of outermost layer sheath filaments constituting an outermost layer sheath of the core strand to the sum S of cross-sectional areas of all filaments constituting the core strand is from 0.69 to 0.74, and a ratio Ps/P of the sum Ps of strengths of the sheath strands to strength P of the cord as a whole is from 0.81 to 0.85.

In the cord of the present invention, preferably, the number of the sheath strands is from 7 to 9. In the cord of the present invention, preferably, all the filaments constituting the core strand have the same diameter. Further, in the cord of the present invention, preferably, a cord diameter is not less than 5.00 mm.

A pneumatic tire of the present invention is characterized in that the steel cord for reinforcing a rubber article of the present invention is used as a reinforcing material.

Effects of the Invention

According to the present invention, it becomes possible to realize a steel cord for reinforcing a rubber article which can further improve cut resistance when applied to a tire.

BRIEF DESCRIPTION OF THE DRAWING

FIG. 1 is a cross-sectional view in the width direction illustrating one configuration example of a steel cord for reinforcing a rubber article of the present invention.

MODES FOR CARRYING OUT THE INVENTION

Hereinafter, embodiments of the present invention will be described in detail with reference to the drawing.

FIG. 1 is a cross-sectional view in the width direction illustrating one configuration example of a steel cord for reinforcing a rubber article of the present invention. As illustrated in the drawing, the cord of the present invention comprises: one core strand 11 having a two-layered layered-twisted structure formed by twisting a plurality of steel filaments 1; and a plurality of (in the illustrated example, seven) sheath strands 12 each having two-layered layered-twisted structure formed by twisting a plurality of steel filaments 2, and has a multi-twisted structure formed by twisting the sheath strands 12 around the core strand 11. In the illustrated cord, the core strand 11 has a 3+8+10 structure in which a first sheath is formed by twisting eight first sheath filaments 1b around a core composed of twisted three core filaments 1a and a second sheath is formed by twisting ten second sheath filaments 1c therearound, and the sheath strand 12 has a 3+8 structure in which a sheath is formed by twisting eight sheath filaments 2b around a core composed of twisted three core filaments 2a. In the illustrated cord, a spiral filament 3 is spirally wound around the outer periphery of the sheath strand 12.

In the present invention, it is important that the ratio S1/S of the sum S1 of the cross-sectional areas of outermost layer sheath filaments 1c constituting an outermost layer sheath of the core strand 11 to the sum S of the cross-sectional areas of all filaments constituting the core strand 11 is from 0.69 to 0.74, and the ratio Ps/P of the sum Ps of the strengths of the sheath strands 12 to the strength P of the cord as a whole is from 0.81 to 0.85. Since a preceding break of an outermost layer filament of a core strand caused by tightening of the core strand by a sheath strand causes decrease in the shear resistance of the cord, in order to prevent an occurrence of such a preceding break, a decrease in the tightening force of a sheath strand and an increase in the shear resistance of an outermost layer filament of a core strand are considered. Here, the magnitude of the tightening force of a core strand by a sheath strand is proportional to the magnitude of the strength of the sheath strand, and the shear resistance of an outermost layer filament of a core strand depends on the magnitude of the total cross-sectional areas of the outermost layer filaments of the core strand. Therefore, in the present invention, the ratio of the total strength of the sheath strand 12 to the strength of the cord is set relatively low from 0.81 to 0.85, thereby decreasing the tightening force of the sheath strand, and at the same time, the ratio of the total cross-sectional areas of outermost layer filaments of the core strand to total cross-sectional areas of the filaments is set relatively high from 0.69 to 0.74, thereby improving the shear resistance of an outermost layer filament of a core strand. This makes it possible to unprecedentedly increase the shear resistance of the cord as a whole.

The value of the above-described ratio S1/S needs to be from 0.69 to 0.74, and preferably, is in the range of from 0.71 to 0.73. When the value of S1/S is less than 0.69, a preceding break of an outermost layer filament of a core strand cannot be prevented. On the other hand, when the value of S1/S is more than 0.74, a filament inside an outermost layer sheath of the core strand becomes too thin, which may cause a preceding break. The value of the above-described ratio Ps/P needs to be from 0.81 to 0.85, and preferably is in the range from 0.81 to 0.83. When the value of Ps/P is more than 0.85, the stress of tightening a core strand is large, which deteriorates the shear resistance of the cord. On the other hand, when the value of Ps/P is less than 0.81, the shear resistance of the sheath strand for itself deteriorates. The absolute value of the sum S1 of the cross-sectional areas of outermost layer sheath filaments constituting an outermost layer sheath of the core strand depends on the diameter of the cord or the like, and is, from the viewpoint of securing a high shear resistance, suitably not less than 1.33 mm$^2$, for example, from 1.60 to 1.90 mm$^2$.

In the cord of the present invention, the number of layers of the layered-twisted structure of the core strand is not particularly limited, and may be, for example, from 2 to 3. In this case, assuming that a first sheath and a second sheath are sequentially formed from the inner layer of the layered-twisted structure, when the core strand 11 has a three-layered layered-twisted structure as illustrated in FIG. 1, the outermost layer sheath of the core strand 11 is the second sheath. The number of layers of the layered-twisted structure of the sheath strand is not particularly limited, and may be, for example, from 2 to 3.

In the cord of the present invention, the number of the sheath strand 12 is preferably from 7 to 9. When all the core strand and sheath strands have the same diameter and the sheath strands are close-packed without a gap therebetween, six sheath strands can be arranged. However, as illustrated in the drawing, in the present invention, since the diameter of the sheath strand 12 is smaller than that of the core strand 11, seven to nine sheath strands 12 can be arranged. Accordingly, by setting the number of the sheath strands 12 to from 7 to 9, a sufficiently strong core strand which can endure the tightening force of the sheath strand can be realized, thereby further improving the cut resistance of the cord.

In the cord of the present invention, when a core strand has a two-layered structure, it is preferable that all filaments constituting the core strand have the same diameter. Although it is possible to improve the shear resistance by making the diameter of the core filament smaller than the diameter of the sheath filament in the core strand, in this case, it is difficult to secure a sufficient amount of clearance between the sheath filaments. Accordingly, when a core strand has a two-layered structure, it is preferable that all filaments constituting the core strand have the same diameter. Similarly, as illustrated, when a core strand have a three-layered structure, it is preferable that, among filaments constituting the core strand 11, all of core filaments 1a and first sheath filaments 1b have the same diameter. When the core filament 1a is made smaller in diameter than the first sheath filament 1b in the core strand 11, it is difficult to ensure sufficient amount of clearance between first sheath filaments. Accordingly, when the core strand has a three-layered structure, it is preferable that all the core filaments 1a and first sheath filaments 1b have the same diameter.

Further, the cord diameter of the cord of the present invention is preferably 5.00 mm or more, for example, from 5.00 to 6.00 mm. By using a cord having a diameter of 5.00 mm or more, it is possible to secure both strength and cut resistance required, particularly for large tires used for heavy duty vehicles such as construction vehicles.

In the cord of the present invention, the wire diameter and tensile strength of the filament to be used, the twisting direction, the twisting pitch, and the like of the filament or strand are not particularly limited, and can be appropriately selected according to the ordinary method as desired. For example, as the filament, a so-called high tensile strength steel having a carbon content of 0.80% by mass or more can be used. The cord of the present invention may or may not include a spiral filament.

Since the cord of the present invention is excellent in cut resistance, it is particularly suitable for a reinforcing material of large tires used for heavy duty vehicles such as construction vehicles, among others, ultra-large off-road radial tires having a tire size of about 40.00 R57. Such a large tire usually comprises: one or more carcasses composed of plies of steel cords extending in the radial direction between a pair of bead cores; at least four belt-crossing layers arranged radially outside the crown portion of the crown portion; and a tread disposed outside in the tire radial direction. The cord of the present invention can be used, for example, as a reinforcing cord for a belt crossing layer in such a tire.

EXAMPLES

Hereinafter, the present invention will be described in more detail by way of examples. In Tables 1 and 2 below, all the "Examples" except for Examples 2 and 3 are prophetic examples (paper examples), and all the "Comparative Examples" except for Comparative Examples 1 and 5 are prophetic comparative examples (paper comparative examples). That is, Examples 1 and 4-6 and Comparative Examples 2-4 and 6-8 are prophetic examples and prophetic comparative examples, respectively.

As shown in the following Tables, the ratio S1/S of the sum S1 of the cross-sectional areas of outermost layer sheath filaments constituting an outermost layer sheath of the core strand to the sum S of the cross-sectional areas of all filaments constituting the core strand and the ratio Ps/P of the sum Ps of the strengths of the sheath strands to the strength P of the cord as a whole were changed by changing the cord structure, to prepare steel cords for reinforcing a rubber article of the working examples (Examples 2 and 3) and the working comparative examples (Comparative Examples 1 and 5) in which a plurality of sheath strands having a layered-twisted structure were twisted around one core strand having a layered-twisted structure. The results of the following evaluations for the obtained cords as well as the prophetic examples and the prophetic comparative examples are also shown in the following Tables.

(Shear Resistance)

For each of the obtained cords, shear resistance was evaluated (for working examples) using a Charpy impact tester and the shear resistance for the prophetic (comparative) examples were calculated based on the working examples. The larger the numerical value is, the more excellent the shear resistance is, which is favorable.

TABLE 1

|  |  | Example 1 | Example 2 | Example 3 | Example 4 | Example 5 | Example 6 | Comparative Example 1 | Comparative Example 2 |
|---|---|---|---|---|---|---|---|---|---|
| Cord structure | | 1 + 7 | 1 + 7 | 1 + 7 | 1 + 7 | 1 + 8 | 1 + 9 | 1 + 6 | 1 + 7 |
| Core strand | Structure | 3 + 8 | 3 + 8 | 3 + 8 | 3 + 8 + 10 | 3 + 8 | 3 + 7 | 3 + 8 | 3 + 8 |
| | Core filament diameter (mm) | 0.51 | 0.52 | 0.54 | 0.285 | 0.54 | 0.55 | 0.345 | 0.57 |
| | First sheath filament diameter (mm) | 0.51 | 0.52 | 0.54 | 0.285 | 0.54 | 0.55 | 0.345 | 0.57 |
| | Second sheath filament diameter (mm) | — | — | — | 0.465 | — | — | — | — |
| | Strength | 5392 | 5517 | 5764 | 6714 | 5764 | 5351 | 3252 | 6126 |
| Sheath strand | Structure | 3 + 8 | 3 + 8 | 3 + 8 | 3 + 8 | 3 + 8 | 3 + 8 | 3 + 8 | 3 + 8 |
| | Number of sheath strands | 7 | 7 | 7 | 7 | 8 | 9 | 6 | 7 |
| | Core filament diameter (mm) | 0.380 | 0.395 | 0.385 | 0.405 | 0.29 | 0.25 | 0.345 | 0.365 |
| | First sheath filament diameter (mm) | 0.400 | 0.395 | 0.385 | 0.405 | 0.38 | 0.30 | 0.345 | 0.365 |
| | Second sheath filament diameter (mm) | — | — | — | — | — | — | — | — |
| | Strength | 3900 | 3906 | 3775 | 4038 | 3392 | 2501 | 3252 | 3513 |
| Cord diameter (mm) | | 5.36 | 5.44 | 5.44 | 5.48 | 5.01 | 4.56 | 4.30 | 5.40 |
| Cord strength (total strength of filaments) (N) | | 32695 | 32859 | 32189 | 34980 | 32897 | 27856 | 22764 | 30717 |
| Total cross-sectional areas of outermost layer sheath filaments of core strand/total cross-sectional area of core strand (S1/S) | | 0.73 | 0.73 | 0.73 | 0.71 | 0.73 | 0.70 | 0.73 | 0.73 |
| Total strength of sheath strand/cord strength (Ps/P) | | 0.83 | 0.83 | 0.82 | 0.81 | 0.82 | 0.81 | 0.86 | 0.80 |
| Shear resistance (kN) | | 11.2 | 11.7 | 11.1 | 11.3 | 10.7 | 9.8 | 6.4 | 9 |

TABLE 2

|  |  | Comparative Example 3 | Comparative Example 4 | Comparative Example 5 | Comparative Example 6 | Comparative Example 7 | Comparative Example 8 |
|---|---|---|---|---|---|---|---|
| Cord structure | | 1 + 6 | 1 + 6 | 1 + 7 | 1 + 8 | 1 + 7 | 1 + 6 |
| Core strand | Structure | 3 + 9 | 3 + 7 + 13 | 3 + 8 + 10 | 3 + 9 + 15 | 3 + 9 + 15 | 3 + 8 |
| | Core filament diameter (mm) | 0.36 | 0.24 | 0.32 | 0.32 | 0.26 | 0.25 |
| | First sheath filament diameter (mm) | 0.36 | 0.34 | 0.32 | 0.32 | 0.26 | 0.33 |
| | Second sheath filament diameter (mm) | — | 0.34 | 0.455 | 0.32 | 0.35 | — |
| | Strength | 3761 | 6157 | 7005 | 6982 | 5549 | 2781 |
| Sheath strand | Structure | 3 + 8 | 3 + 6 + 12 | 3 + 8 | 3 + 9 | 3 + 9 | 3 + 9 |
| | Number of sheath strands | 6 | 6 | 7 | 8 | 7 | 6 |
| | Core filament diameter (mm) | 0.36 | 0.24 | 0.385 | 0.29 | 0.325 | 0.29 |
| | First sheath filament diameter (mm) | 0.36 | 0.24 | 0.385 | 0.29 | 0.325 | 0.29 |
| | Second sheath filament diameter (mm) | — | 0.34 | — | — | — | — |
| | Strength | 3448 | 4966 | 3775 | 2775 | 3264 | 2775 |
| Cord diameter(mm) | | 4.49 | 5.23 | 5.44 | 4.38 | 4.48 | 3.61 |
| Cord strength (total strength of filaments)(N) | | 24449 | 35953 | 33430 | 29182 | 28397 | 19431 |
| Total cross-sectional areas of outermost layer sheath filaments of core strand/total cross-sectional area of core strand (S1/S) | | 0.75 | 0.60 | 0.65 | 0.56 | 0.69 | 0.82 |
| Total strength of sheath strand/cord strength (Ps/P) | | 0.85 | 0.83 | 0.79 | 0.76 | 0.80 | 0.86 |
| Shear resistance (kN) | | 7.2 | 9.7 | 9.8 | 8.5 | 8.2 | 5.5 |

As can be seen from the results in the above Tables, in each of the cords of the Examples in which a plurality of sheath strands having a layered-twisted structure were twisted around one core strand having a layered-twisted structure, and the ratio S1/S and ratio Ps/P satisfied predetermined ranges, it is obvious that the shear resistance was improved.

DESCRIPTION OF SYMBOLS

1, 2 Steel filament
1a, 2a Core filament
1b First sheath filament
1c Second sheath filament(outermost layer sheath filament)
2b Sheath filament
3 Spiral filament
11 Core strand
12 Sheath strand

The invention claimed is:

1. A steel cord for reinforcing a rubber article comprising: one core strand having a layered-twisted structure formed by twisting a plurality of steel filaments; and a plurality of sheath strands having a layered-twisted structure formed by twisting a plurality of steel filaments, wherein the sheath strands are twisted around the core strand, and wherein a ratio S1/S of the sum S1 of cross-sectional areas of outermost layer sheath filaments constituting an outermost layer sheath of the core strand to the sum S of cross-sectional areas of all filaments constituting the core strand is from 0.69 to 0.74, and a ratio Ps/P of the sum Ps of strengths of the sheath strands to strength P of the cord as a whole is from 0.81 to 0.85.

2. The steel cord for reinforcing a rubber article according to claim 1, wherein the number of the sheath strands is from 7 to 9.

3. The steel cord for reinforcing a rubber article according to claim 1, wherein all the filaments constituting the core strand have the same diameter.

4. The steel cord for reinforcing a rubber article according to claim 1, wherein a cord diameter is not less than 5.00 mm.

5. A pneumatic tire, wherein the steel cord for reinforcing a rubber article according to claim 1 is used as a reinforcing material.

6. The steel cord for reinforcing a rubber article according to claim 1, wherein a number of layers of the layered-twisted structure of the sheath strand is 2.

7. The steel cord for reinforcing a rubber article according to claim 1, wherein the sum S1 of the cross-sectional areas of the outermost layer sheath filaments is greater than or equal to 1.33 mm$^2$.

* * * * *